(12) United States Patent
Leavitt et al.

(10) Patent No.: US 9,416,027 B2
(45) Date of Patent: Aug. 16, 2016

(54) METHOD FOR PASSIVE MIXING

(71) Applicants: Bruce R. Leavitt, Washington, PA (US); Timothy P. Danehy, Saxonburg, PA (US)

(72) Inventors: Bruce R. Leavitt, Washington, PA (US); Timothy P. Danehy, Saxonburg, PA (US)

( * ) Notice: Subject to any disclaimer, the term of this patent is extended or adjusted under 35 U.S.C. 154(b) by 597 days.

(21) Appl. No.: 13/706,310

(22) Filed: Dec. 5, 2012

(65) Prior Publication Data
US 2013/0233808 A1  Sep. 12, 2013

Related U.S. Application Data

(60) Provisional application No. 61/609,670, filed on Mar. 12, 2012.

(51) Int. Cl.
| | | |
|---|---|---|
| *C02F 1/00* | (2006.01) | |
| *C02F 1/66* | (2006.01) | |
| *C02F 1/68* | (2006.01) | |
| *C02F 103/10* | (2006.01) | |

(52) U.S. Cl.
CPC ............... *C02F 1/006* (2013.01); *C02F 1/688* (2013.01); *C02F 1/66* (2013.01); *C02F 2103/10* (2013.01)

(58) Field of Classification Search
CPC ............ C02F 1/66; C02F 1/687; C02F 1/688; C02F 1/74; C02F 2103/10; C02F 1/52; C02F 1/5227; C02F 1/5263; C02F 1/5281; C02F 1/529; C02F 1/685; B01F 3/04106; B01F 3/04503; B01F 3/04517; B01F 2003/04134; B01F 2003/04205

See application file for complete search history.

(56) References Cited

U.S. PATENT DOCUMENTS

| | | | | |
|---|---|---|---|---|
| 830,552 | A * | 9/1906 | Zeigler | 210/199 |
| 892,772 | A | 7/1908 | Taylor | |
| 1,310,382 | A * | 7/1919 | Auld et al. | 210/710 |
| 2,749,304 | A * | 6/1956 | Whitlock | 210/88 |
| 3,288,292 | A * | 11/1966 | Stone | C02F 1/5281 210/207 |
| 3,932,275 | A * | 1/1976 | Mewes | B01D 21/01 210/712 |
| 4,483,361 | A | 11/1984 | Jungbert, Sr. | |
| 4,630,931 | A * | 12/1986 | Harsanyi | B01F 13/0244 366/101 |
| 5,167,800 | A | 12/1992 | Ringer et al. | |
| 6,272,839 | B1 * | 8/2001 | Karl | 60/783 |
| 2012/0085705 | A1 * | 4/2012 | Theodore | A01G 33/00 210/620 |

* cited by examiner

*Primary Examiner* — David C Mellon
(74) *Attorney, Agent, or Firm* — Gary P. Topolosky

(57) ABSTRACT

An improved method that requires no electricity or moving parts to increase lime utilization where pebble quicklime (CaO) and/or hydrated lime (Ca(OH)$_2$) is used for mine drainage treatment. Lime utilization at such facilities has been historically poor due to the low solubility, high density, and large particle size of pebble quicklime. This invention takes two passive technologies, a diversion well-inspired MixWell system followed by a TROMPE-driven, air lift mixer for enhancing lime dissolution. It showed an estimated 40 to 57 percent reduction in lime usage.

5 Claims, 12 Drawing Sheets

METHOD FOR PASSIVE MIXING

CROSS-REFERENCE TO RELATED APPLICATION

This application is a perfection of U.S. Provisional Ser. No. 61/609,670, filed on Mar. 12, 2012, the disclosure of which is fully incorporated by reference herein.

FIELD OF THE INVENTION

This invention relates to water treatment facilities and, specifically, to mine drainage systems. Particularly, it relates to systems that use pebble quicklime (CaO) and/or hydrated lime ($Ca(OH)_2$) as feedstock. This invention improves the overall efficiencies of such systems by providing a passive air source that can function without the need to supply any outside electricity.

BACKGROUND OF THE INVENTION

Pebble Quicklime

Pebble Quicklime is derived from the heating of limestone to convert the calcium or magnesium carbonate into the respective oxide. Depending on the limestone source there are varying ratios of Calcium and Magnesium oxide. In addition to the Calcium/Magnesium oxide, there is an inert component that does not contribute to acid neutralization. Pure Pebble quicklime has a neutralization equivalent of 0.56 tons per ton of acidity compared to hydrated lime with a neutralization equivalent of 0.74 tons per ton of acidity. In addition, its higher density 55 to 60 pounds per cubic foot vs. 30 to 40 pounds per cubic foot allows for more alkalinity to be delivered on a per truck basis and it also allows for a smaller product silo.

Water powered mixers or "dosers" have been deployed to deliver pebble quicklime at sites where electricity is not readily available. These water-powered systems are sometimes referred to as semi-active. The solubility of pebble quicklime is somewhat limited, 1.33 g/L while hydrated lime is somewhat more soluble at 1.76 g/L. Before it can dissolve in water, pebble quicklime has to be converted from Calcium oxide to calcium hydroxide, a process called slaking.

The slaking equation is:

$$CaO + H_2O \rightarrow Ca(OH)_2 \quad (1)$$

It is an exothermic reaction commonly confined to a slaker where elevated temperatures promote the slaking process. Limited quantities of water are used to keep temperatures elevated. If excessive amounts of water are used, the lime is said to be "drowned" and the slaking reaction is inhibited with a coating of calcium hydroxide on the particle surface to restrict water penetration. It also restricts the reaction. This is the typical state of reaction at most semi-active treatment sites. To overcome this limitation, pebble quicklime is allowed to deposit in long channels where dissolution can proceed slowly. This can lead to low lime utilization at the treatment site due to un-dissolved lime buried in the channel or lime that has absorbed carbon dioxide from the air and converted back to calcite.

Manor

The Manor mine is located in North Central Pennsylvania 12 miles northeast of the town of Clearfield. The mining took place in the Lower Kittanning seam in an up-dip direction. The mine discharge emanates from a wet seal installed about 2004. Under a consent agreement, Pennsylvania Department of Environmental Protection (PADEP) has been managing the operations a treatment plant at Manor since 2004. Prior to the recent modification, treatment consisted of calcium oxide addition using a water wheel (AquaFix) to regulate dosing. A mixing channel 300 feet in length with a vertical drop of about 20 feet was provided to allow for mixing and dissolution of the pebble quicklime. The treated water was allowed to cascade for aeration and then was allowed to settle in three baffled ponds before discharging. As a result of this process, significant quantities of lime were deposited in the mixing channel and in the first settling pond. This reduced the storage capacity of the settling pond and resulted in the disposal of large amounts of unused lime along with the cost of lime sludge removal.

SUMMARY OF THE INVENTION

Due to difficulties with the aforementioned plant operation, the inventors were asked to redesign the plant with a view to improving lime utilization and overall system operation. Two new concepts for lime mixing were designed and installed at the Manor facility.

The first device, called a MixWell, is an improvement on the known diversion well concept. Raw water is directed via a smaller diameter pipe into a larger diameter vertical pipe where it is discharged at the bottom. Pebble quicklime is directed into the MixWell where the dense calcium oxide particles descend to the bottom. There they are agitated by incoming raw water. Either abrasion, exposure to low pH water or a combination of both enhances the breakdown of the large particles for improving lime utilization efficiency. Unlike a diversion well, there is not a thick bed of material to be suspended with the present invention. Furthermore, the lime is added to the MixWell on a continuous basis rather than using the typical batch delivery for known diversion wells.

The second device, called an "A-Mixer", is derived from an airlift mixer. It consists of a large tank to provide residence time. In the center of that tank is a vertical pipe suspended from the tank bottom and rising to just below the normal water level in that tank. An air pipe, with an air distributor (diffuser), is suspended in the middle the vertical pipe and is connected to a source of compressed air. In this case, a Trompe located below the treatment plant discharge was installed to provide the compressed air. Air is bubbled up through the vertical pipe inducing water flow through the pipe. This causes a convective-like circulation in the tank that keeps small lime particles suspended and available for dissolution. In addition, a perforated pipe located at the bottom of the tank and plumbed to the bottom of the airlift mixer provides water circulation through any settled lime particles.

This invention addressed the effectiveness of these two devices in terms of individual unit operation and the combined effect on lime utilization.

BRIEF SUMMARY OF THE DRAWINGS

Further features, objectives and advantages of this invention will become clearer when reviewing the following Description of Preferred Embodiments, made with reference to the accompanying drawings in which.

DESCRIPTION OF PREFERRED EMBODIMENTS

Figure 1:
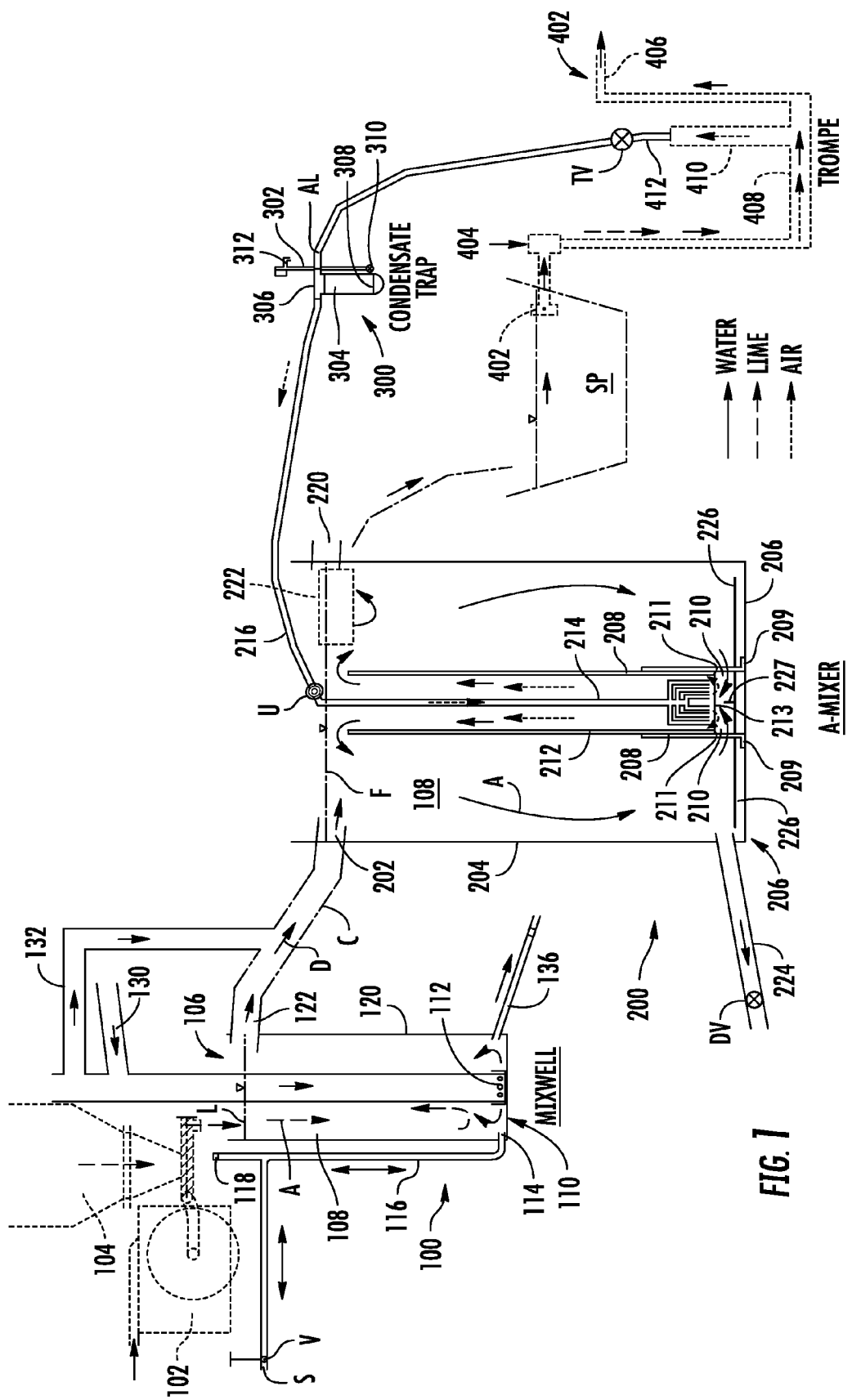
FIG. 1 is a schematic diagram of a whole system according to one embodiment of this invention.

It should be noted that common features in the different views of this invention are shown with the same reference numeral(s). For alternate embodiments of the same component, there is consistent numbering though in the next thousand series. And when referring to any numerical ranges herein, it should be noted that all numbers within the range, including every fraction or decimal between its stated minimum and maximum, are considered to be designated and disclosed by this description.

Figure 2:
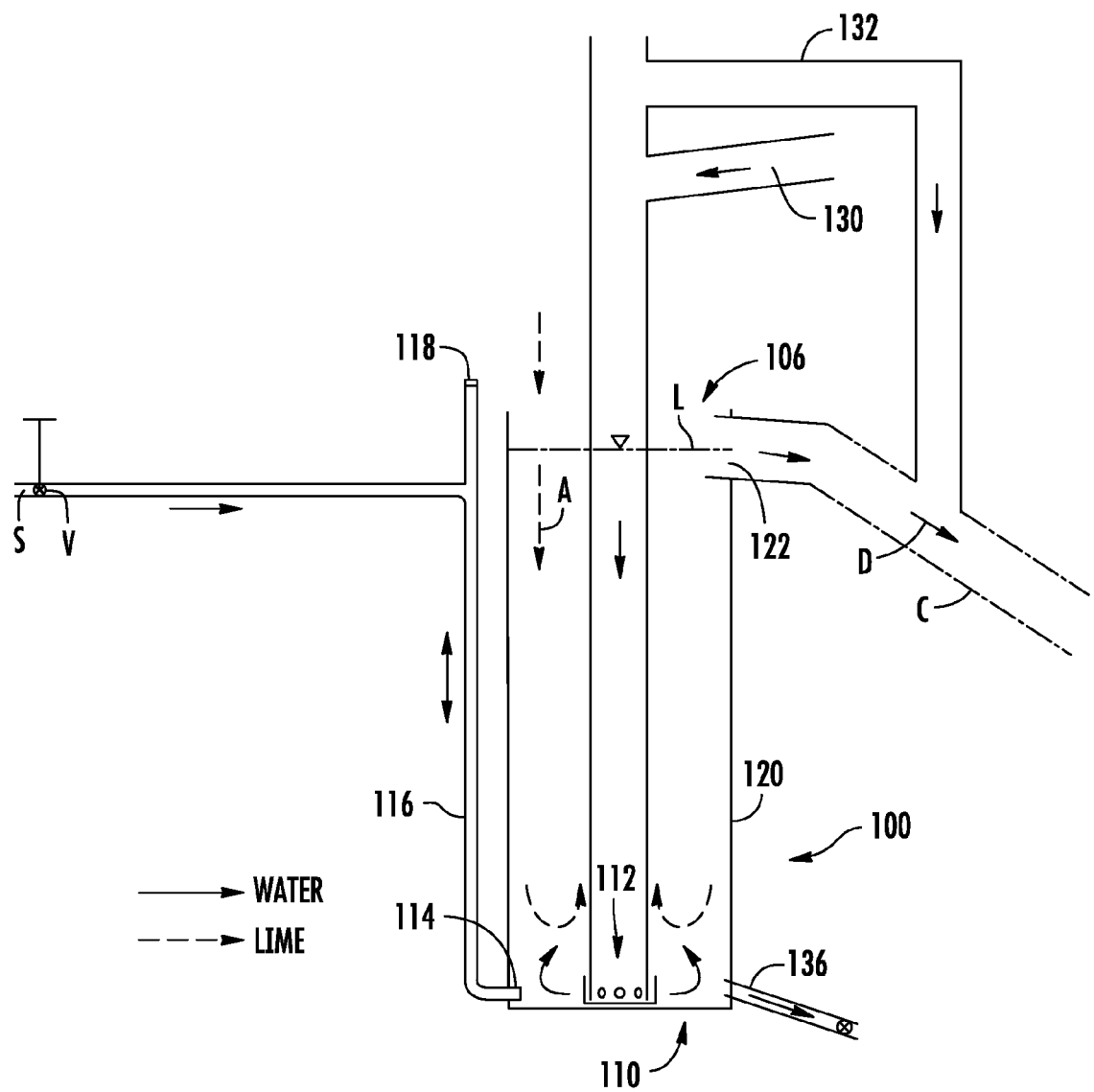
FIG. 2 is a close up schematic of the MixWell component from FIG. 1.
Figure 3:
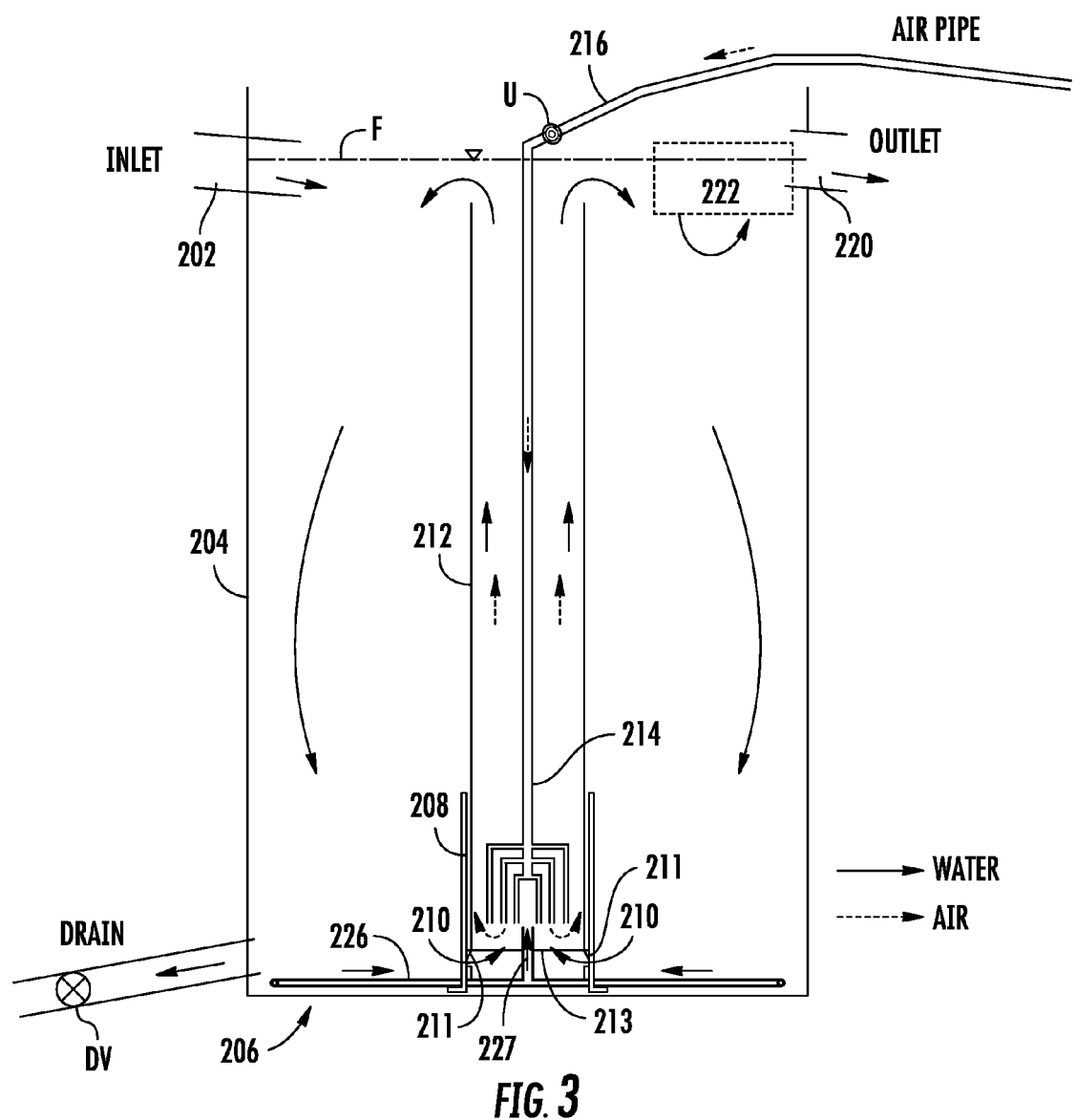
FIG. 3 is a close up schematic of the A-Mixer component from FIG. 1.

There is shown in accompanying FIG. 1, a schematic showing a MixWell system in combination with an A-Mixer from which an air line is lead from a Trompe chamber according to one embodiment of this invention. Subcomponents of that arrangement are then focused upon for close up views in FIG. 2 (the MixWell); FIG. 3 (the A-Mixer) and FIG. 4 (the condensate trap). The A-Mixer component herein represents an improvement over U.S. Pat. No. 4,630,931. It improves over the known art primarily by adding a perforated pipe across its tank bottom for greater lime dissolution. The purpose of prior art systems was to suspend solids. This invention, in addition, uses water pressure to cause a flow through of settled lime particles to occur ultimately leading to a better, fuller dissolution of such particles. The airlift of this invention creates a low pressure zone, preferably in a central pipe at its base from which a perforated pipe extends in both directions. Alternatively, the central pipe can be removed and replaced with a long extension from one end of the perforated pipe for exiting the tank at a point below its normal water level per FIG. 3A.

The Trompe device used in conjunction with the same is an improvement over U.S. Pat. No. 892,772. And the freeze-proof hydrant used in preferred embodiments of this invention is as shown in U.S. Pat. No. 4,483,361.

Referring now to FIG. 1, moving from left to right, there is shown the MixWell component 100 starting with a reagent feed system 102. One such system is the AquaFix water-powered reagent auger system as disclosed in U.S. Pat. No. 5,167,800. It is preferably situated adjacent or near a reagent silo or hopper 104 or other comparable container. Reagent drops into the top 106 of MixWell from that auger (or other comparable device) as needed, i.e. a sluice.

The finer reagent particles leave the MixWell with dissolved reagent in mine drainage water. Ideally, discharge D from the MixWell flows directly into the A-Mixer, generally 200, via channel C or another conveyance device. The other (sufficiently larger) reagent particles flow down annulus 108 of the MixWell 100, in the direction of arrow A, toward the base 110 of annulus 108, where is situated a nozzle 112 and opening 114 to flush drain 116 (for serving as a clean out pipe). Alternately, a gravity drain pipe 136 may be used where feasible. A plug or cap 118 to the top of flush drain 116 allows access for mechanical cleaning, pumping, etc. A source of flush water S (i.e., mine drainage or other water) may be passed through valve V for assisting with the clean out of flush drain 116.

The main constituent to MixWell component 100 is the holding well itself. As schematically shown, holding well 120 consists of a large pipe set vertically though it is to be understood that a tank or other similar structure may be substituted therefore. This configuration is designed to allow for larger reagent particles to remain near the base 110 of holding well 120 where said particles can; (a) be ground smaller by collision with other reagent particles; and (b) continue to dissolve.

Toward the top of holding well 120 is a well outlet 122 through which the finer reagent particles leave the MixWell component 100 with dissolved reagent in mine drainage/water. Ideally, such MixWell "discharge" flows directly (preferably by gravitational flow) into the A-Mixer 200 via channel C or another intra-component conveyance device.

The MixWell component 100 of preferred embodiments (as schematically shown) further includes an incoming pipe 130 through which mine drainage or other water is conveyed; and an overflow pipe 132 (positioned above incoming pipe 130) used for conveying excess flow away from the MixWell.

As for the A-Mixer component 200, the focus of FIG. 3, it starts with a tank inlet 202 immediately adjacent channel C for receiving the MixWell discharge and holding same in its main holding tank 204. As discharge flows down to the bottom 206 of holding tank 204, it surrounds a preferably centrally located pipe stand 208. As shown, pipe stand 208 consists of a plurality of L-brackets having legs 209 that rest or are mounted to bottom 206 of tank 204. At an intermediate point along the body of each stand 208, there exists an angled ledge 211 on which will rest the lower end 213 to vertical tube, channel or pipe 212. An air diffuser 214 is lowered and allowed to discharge air into pipe 212.

With the foregoing, there is formed an aperture or gap 210 around most of the lower end 213 of pipe 212 with legs 209 to stand 208 resting at least as low as the circulation line for sludge leachate within tank 204. Water can circulate into that gap 210 as indicated by the water flow arrows on both sides to gap 210. It is anticipated that four, evenly spaced legs 209 are sufficient for supporting and suspending stand 208 upwardly from bottom 206 to tank 204. But fewer or greater amounts of legs 209, or thicker variations of stand supports (with a plurality of apertures/gaps there beneath) may be used as well.

Figure 4:
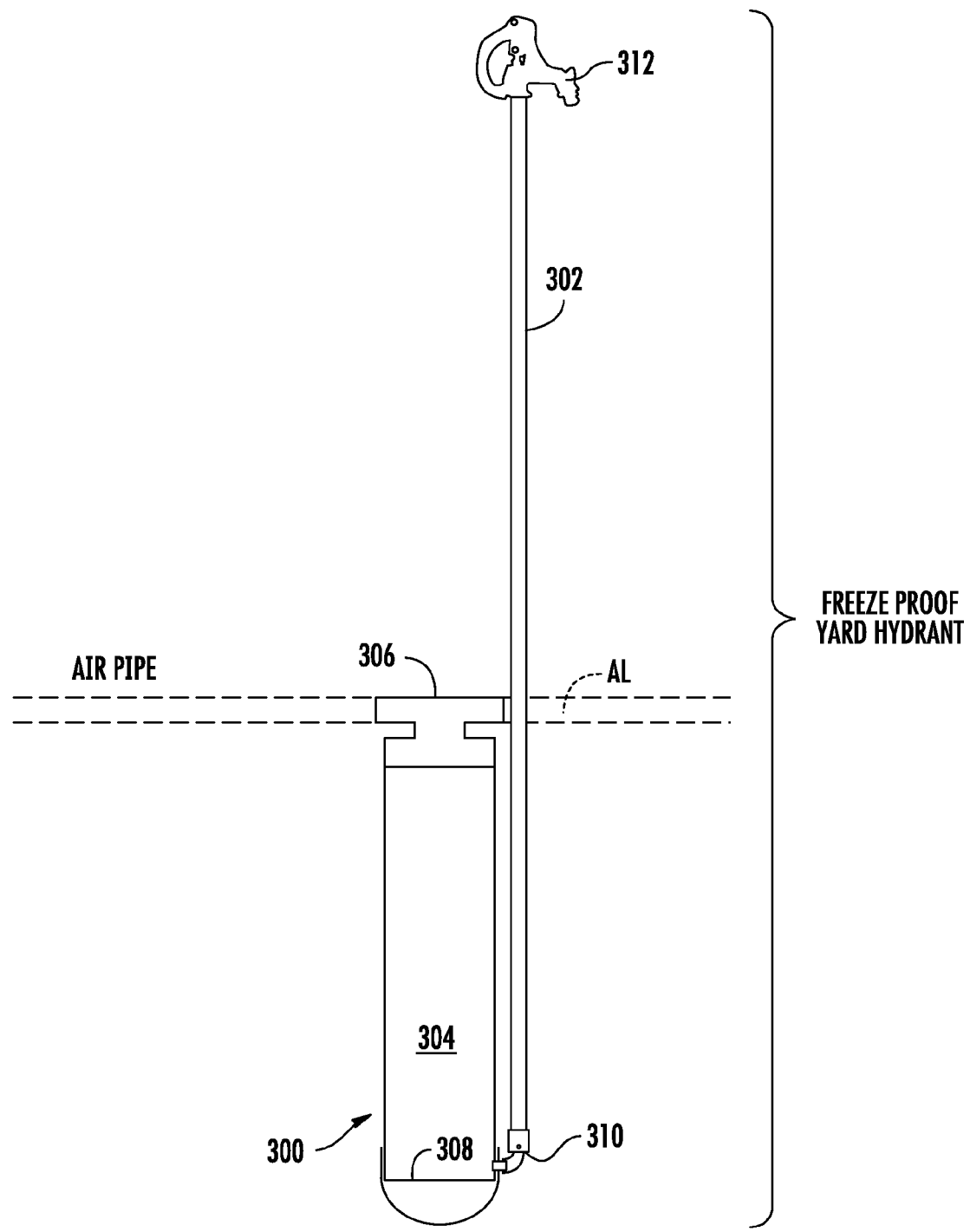
FIG. 4 is a close up schematic of the condensate trap component from FIG. 1.

In this embodiment of the invention, air diffuser 214 from an external air line 216 that passes through union U and back to a condensate trap 300 with pipe 302, the focus of FIG. 4. As shown, air diffuser consists of several fork-like prongs extending downwardly from a common air line exit point, said prongs serving to increase the distribution area of air exposure from air line 216.

Holding tank 204 has its own fill line F such that when liquid levels exceed that line, they will pass through tank outlet 220 where it is conveyed to a settling pond SP or other settling basin/tank. Optionally, in order to help retain fine particulates inside of holding tank 204, there is included a top baffle 222 behind or otherwise adjacent tank outlet 220. Also, for better circulation and tank cleaning, there may be added an optional drainpipe 224 from the bottom 206 of holding tank 204, said drainpipe 224 being fitted with its own valve DV.

On the bottom of holding tank 204, a perforated pipe 226 is placed horizontally. The perforations in pipe 226 are sufficiently small to prevent settled particles from entering the pipe. This pipe is directed, but not connected to the bottom of pipe 212. A centrally located, vertical extension 227 to pipe 226 rises to near the ends to the various prongs of air diffuser 214. Low pressure created by the air lift in pipe 212 induces water flow through vertical extension 227 and hence through the settled particles, into the perforated pipe and hence into the flow in pipe 212 thus promoting dissolution of the lime particles.

Figure 3A:
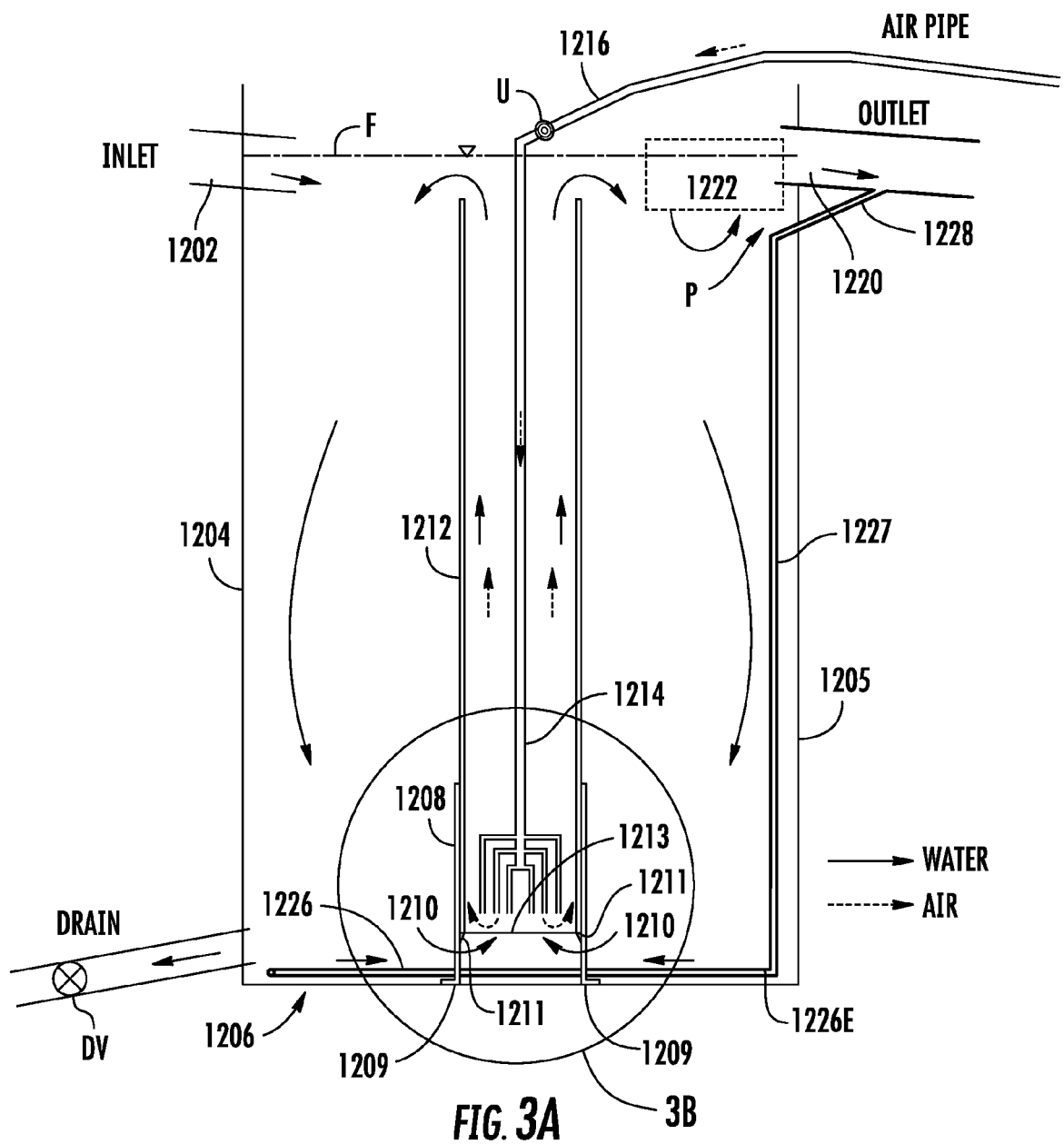
FIG. 3A is a close up schematic of an alternate embodiment of A-Mixer component according to this invention.

In an alternative embodiment, shown in FIG. 3A, the equivalent to central vertical extension 227 has been replaced by a vertical pipe extension 1227 from one end 1226E of perforated pipe 1226. That vertical extension rises along or adjacent to one side 1205 of tank 1204 before exiting the tank at a preferred point P below outlet 1220 of tank 1204. There, this alternate exit 1228 to perforated pipe 1226 will rejoin/reconnect to outlet 1220 external to tank 1204. With this configuration, the water pressure represented by the difference between fill line F and exit point P causes flow to occur through the settled lime particles promoting dissolution of the lime.

Figure 3B:
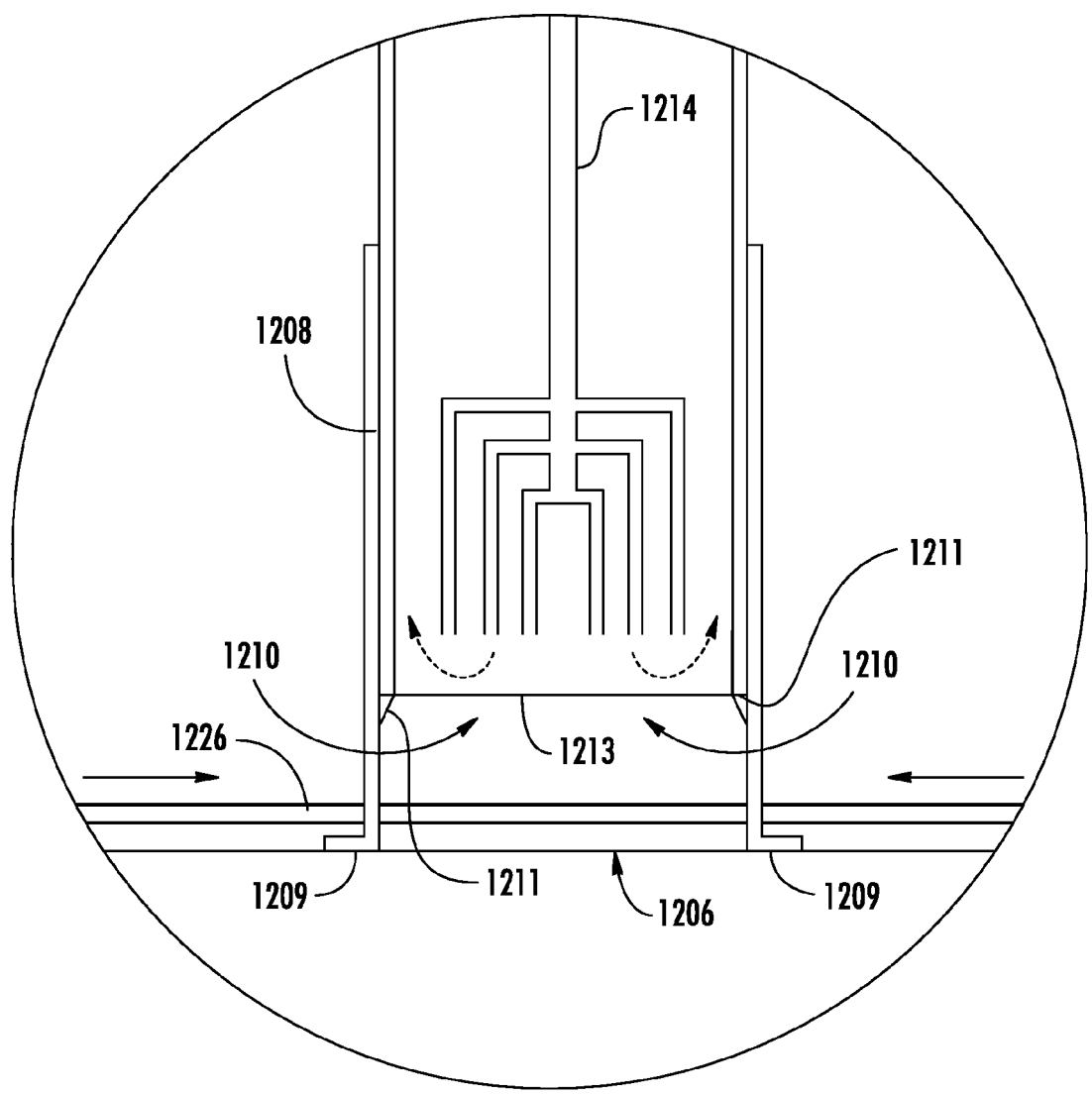
FIG. 3B is a close up of the circled region in FIG. 3A.

For greater clarity of components, FIG. 3B provides an exploded view of the lower end elements to the alternative embodiment specifically showing stand 1208, its legs 1209 resting on tank bottom 1206 and stand ledge 1211 upon which rests the lower edge 1213 to pipe 1212, all of said components working together to create/gap water flow gap 1210. For illustration purposes, the horizontally extending perforated pipe has been deleted. It is to be understood that a similar arrangement exists near the bottom to tank 204 in FIG. 3 with the addition of vertical extension 227 thereto.

As best seen in FIG. 4, one preferred embodiment of condensate trap, generally 300, consists of a condensate reservoir 304 through the top 306 of which runs an air line AL. At the bottom 308 of said reservoir 304, there is a connection to a freeze-proof valve 310 that, itself, rises above ground level before terminating in its own yard hydrant 312 or other valve-bleeding device/means.

Also in preferred embodiments of this invention, the discharge from settling pond SP, outside of holding tank 204, can be connected to a Trompe air chamber unit, generally 400. The fluid inlet 402 to that Trompe chamber sits near the top to settling pond SP with at least some portion of same extending outwardly above the fluid levels in said settling pond at all times. That Trompe inlet 402 connects to a Trompe air inlet 404 that channels downwardly, over and back up to its own Trompe outlet 406. At an intermediate point along cross channel 408 to the Trompe chamber 400, a Trompe air chamber 410 extends upwardly. An air pipe line 412 connected to that air chamber 410 passes through Trompe valve TV before connecting to the aforementioned condensate trap 300. That connecting air line accepts compressed air from Trompe chamber 400 for use to power the air diffuser unit 214 in A-Mixer 200.

Example

Raw Water

Water discharging from the Manor mine ranges in flow from 78 to over 500 gallons per minute. The raw mine water contains the following constituents:

TABLE 1

Raw Water Quality

| Parameter | Date | | | | | | |
|---|---|---|---|---|---|---|---|
| Date | Jan. 6, 2012 | Jan. 16, 2012 | Jan. 23, 2012 | Jan. 31, 2012 | Feb. 7, 2012 | Feb. 21, 2012 | Units |
| pH Field | 3.48 | 3.43 | 3.53 | 3.38 | 3.45 | 3.69 | S.U. |
| Acidity | 466 | 468 | 458 | 445 | 422 | 417 | mg/L |
| Iron | 233 | 201 | 231 | 183 | 210 | 203 | mg/L |
| Aluminum | 19.3 | 22.3 | 15.6 | 12.9 | 11.4 | 16.8 | mg/L |
| Manganese | 3.62 | 2.99 | 3.13 | 3.23 | 3.43 | 3.40 | mg/L |
| Calcium | 166 | 140 | 160 | 138 | 145 | 141 | mg/L |
| Magnesium | 43.3 | 49.7 | 51.7 | 54.1 | 44.9 | 45.7 | mg/L |

Field Investigation

Water from the modified treatment plant was sampled at four locations: Raw water; MixWell outflow; A-Mixer inflow; and A-Mixer outflow. Note, due to site conditions, the A-Mixer is located down gradient of the MixWell. The influent of the A-Mixer travels approximately 150 feet along the existing mixing channel prior to entering the A-Mixer. With the exception of the raw water, these samples were quite complex in that they contained calcium oxide/hydroxide particles in suspension along with a suspension of ferrous hydroxide flock which is actively trying to oxidize to ferric hydroxide. Special procedures had to be taken to get a representative sample from these three locations. Field filtered sample were desired so that the dissolved lime could be separated from the lime that was still in particulate form. A 0.45 micron filter was used for this purpose. The presence of the ferrous hydroxide flock greatly inhibited this filtration. To help avoid this problem these samples were allowed to sit for 10 minutes before filtering so that the suspend particles could settle.

Particle Size Analysis

Figure 5:
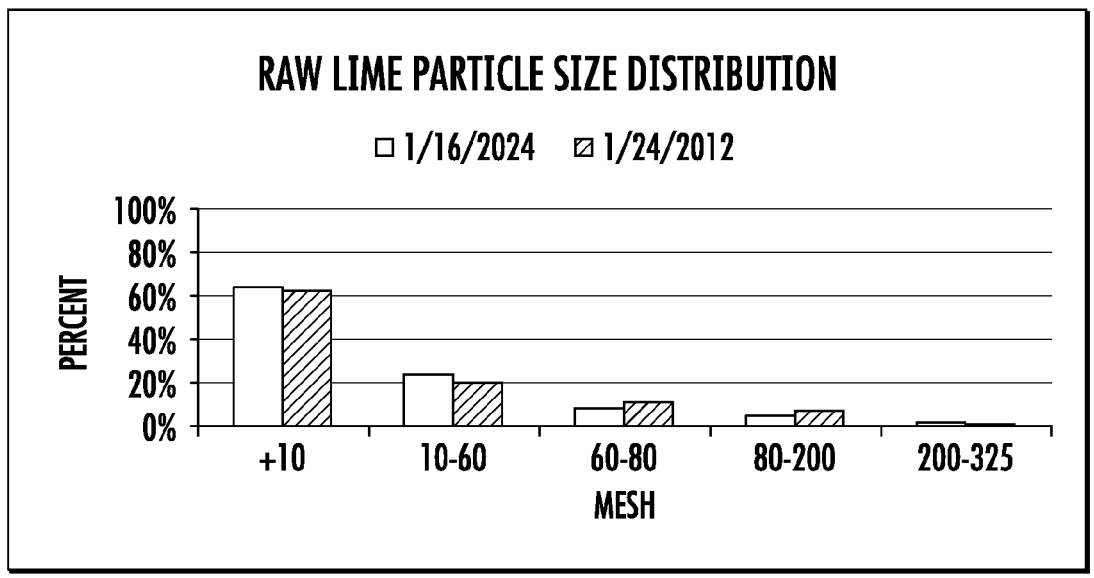
FIG. 5 is a graph showing the pebble quicklime particle size distribution observed with one example of the present invention.
Figure 6:
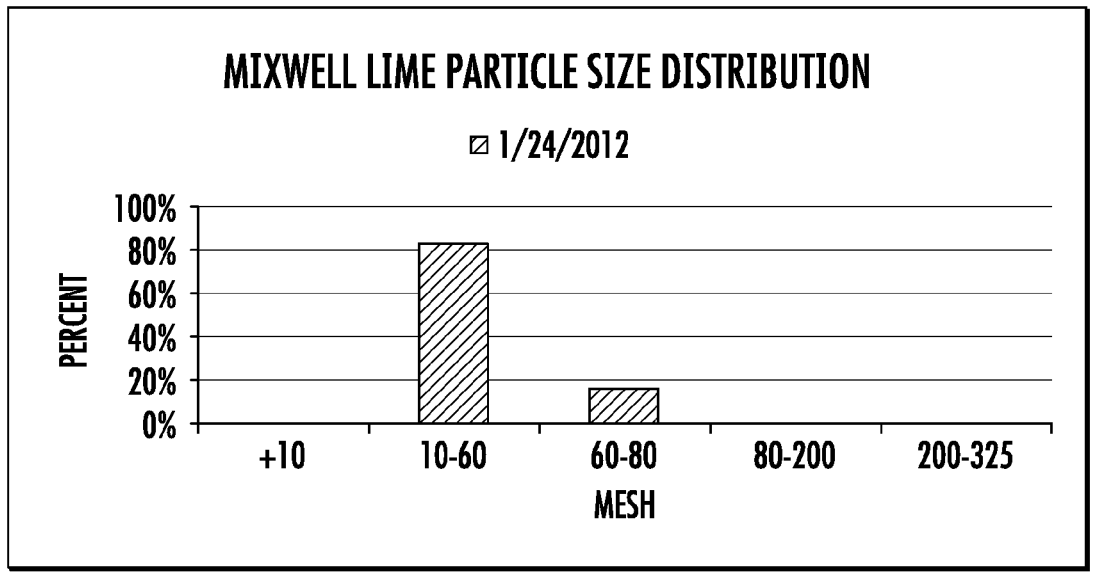
FIG. 6 is a graph showing the MixWell discharge particle size distribution observed.
Figure 7:
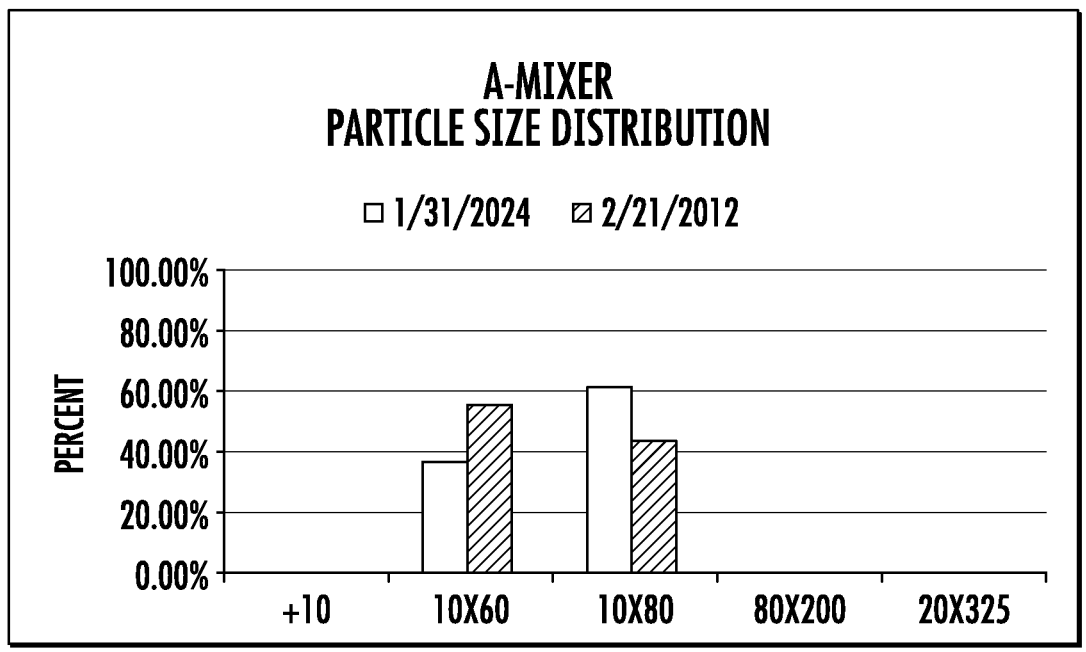
FIG. 7 is a graph showing the A-Mixer discharge particle size distribution observed.

Pebble Quicklime samples were taken from the AquaFix feeder at the Manor site. These samples were sieved through a 10, 60, 80, 200, and 325 mesh screens. Effluent from the MixWell and the A-Mixer were also wet sieved through the 10, 60, and 80 screens; finer screens were clogged, plugged, occluded or "blinded" by the ferrous hydroxide flock. FIG. 5 shows the particle size distribution of the raw lime product, FIG. 6 shows the particle size contained in the effluent water from the MixWell, and FIG. 7 shows the particle size contained in the effluent from the A-Mixer. It was not possible to sieve the entire flow from the MixWell, consequently, a mass balance based on particle weight is not possible.

Figure 8:
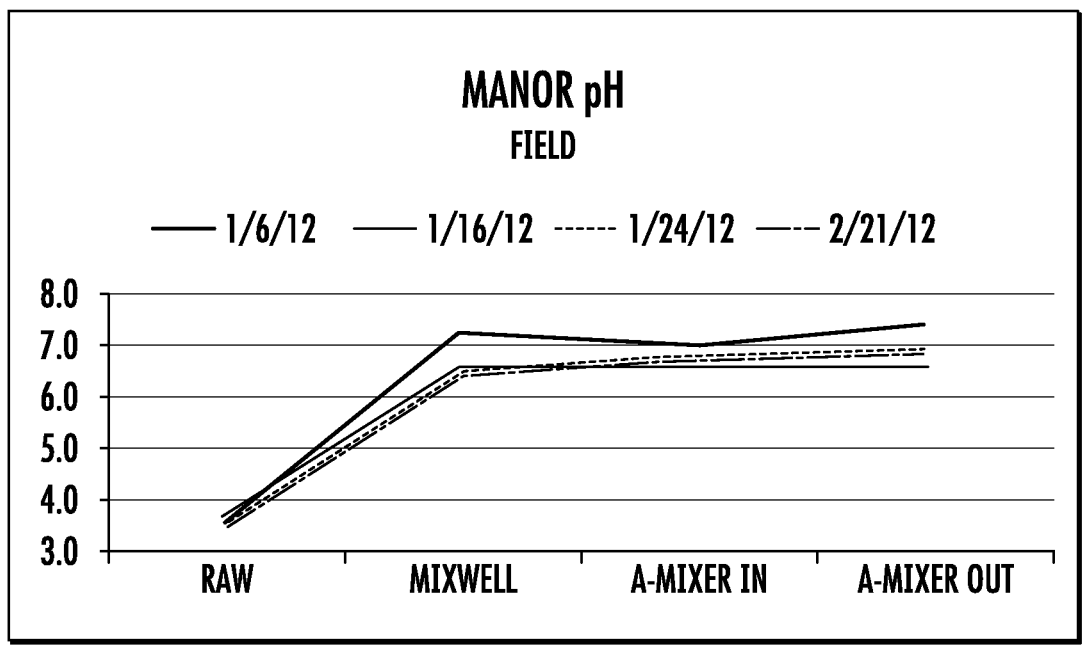
FIG. 8 is a graph comparing pH levels through stages of the invention during various trials at one test location (i.e. the Manor site)

The graphs show continued degradation of the particle size as it moves through the system. Over 60 percent if the raw lime is retained on the number 10 sieve. Effluent from the MixWell has no material on the number 10 sieve and 80 percent of the material retained on the number 60 sieve. Effluent from the A-Mixer has between 40 to 55 percent retained on the number 60 sieve with a similar range being retained on the number 80 sieve. Note that all of the raw lime that was retained on the number 10 screen has been reduced to minus 10 mesh by the MixWell.

pH pH was measured, in the field, at four locations: raw water; effluent from the MixWell; influent into the A-Mixer; and effluent from the A-Mixer. FIG. 8 is a graph of these data measured on four different dates. The pH is substantially increased in the MixWell. Two of the plots show an increase in pH as the water crosses the lime bed and two of the plots show a pH decrease as the was traverses the lime bed. Three of the plots show a slight increase in pH in the A-Mixer and one of the plots shows no change in pH.

The chemistry driving the pH rise in the MixWell is straightforward. The pebble quicklime dissolves raising the pH and some of the dissolved ferrous iron precipitates as ferrous hydroxide flock. Between the MixWell discharge and the A-Mixer inlet is about 150 feet of the existing mixing channel. In the mixing channel; minor amounts of additional raw/other water is added, lime is dissolved, and some ferrous iron is oxidized. As a consequence the pH is variable depending on lime dosing. The pH in the A-Mixer is also complicated, a steady to slightly rising pH is observed but this must be viewed in relationship to the dissolved iron data.

Dissolved Oxygen

Figure 9:
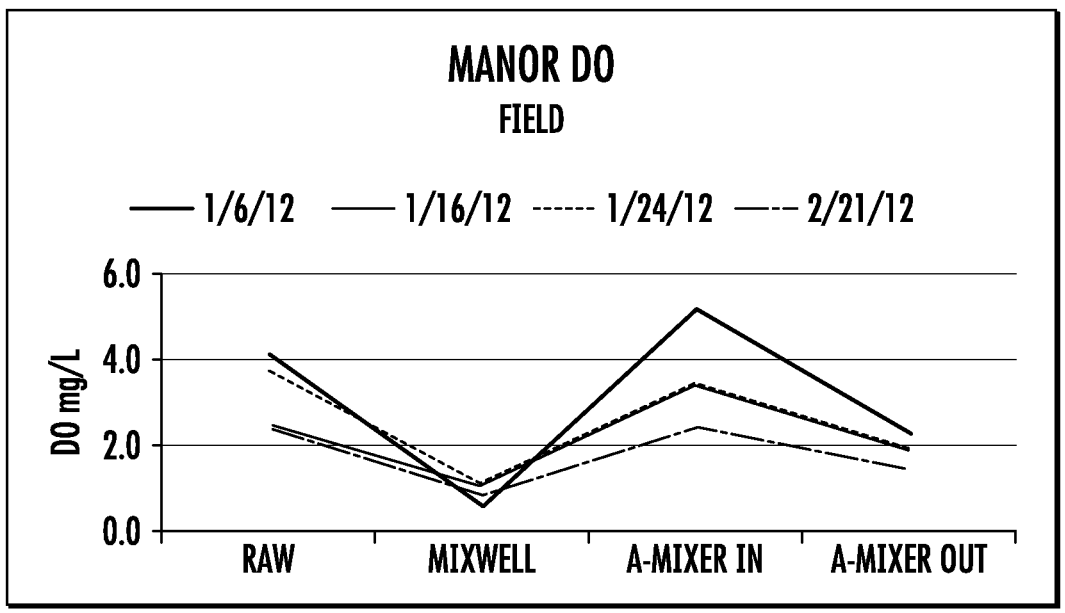
FIG. 9 is a graph comparing Dissolved Oxygen levels through stages during various trials at the Manor site.

A plot of the DO data is shown in FIG. 9. As soon as the pebble quicklime is added to the raw water nearly all available oxygen is consumed. As the water flows over the lime channel oxygen is reintroduced, but it is again consumed in the A-Mixer even though air is also being added.

These drops in DO concentration are attributed to ferrous iron oxidation to ferric iron (equation 1) or alternatively, ferrous hydroxide oxidation to ferric hydroxide (equation 4). The ferrous oxidation reaction consumes oxygen and generates acidity by the following two equations:

$$Fe^{+2}+\tfrac{1}{4}O_2+H^+ \rightarrow Fe^{+3}+\tfrac{1}{2}H_2O \quad (2)$$

When the ferric iron precipitates three moles of acidity are generated for each mole of iron. This equation will be useful when we consider iron precipitation in the A-Mixer.

$$Fe^{+3}+3H_2O \rightarrow Fe(OH)_3+3H^+ \quad (3)$$

The net reaction is that two moles of acidity are created for each mole of iron oxidized and precipitated. This oxidation reaction is pH limited and is only expected to be significant above a pH of 7.

A second reaction may also be occurring. Ferrous hydroxide also known as green rust has been observed in all parts of the semi-active treatment system. This ferrous hydroxide can be converted to Ferric hydroxide without the generation of acidity.

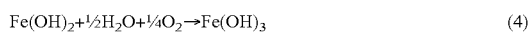

$$Fe(OH)_2+\tfrac{1}{2}H_2O+\tfrac{1}{4}O_2 \rightarrow Fe(OH)_3 \quad (4)$$

In this case the addition of oxygen is the only requirement as all of the other reactants are present. At pH lower than 7 this is expected to be the dominant reaction in the A-Mixer.

Alkalinity

Figure 10:
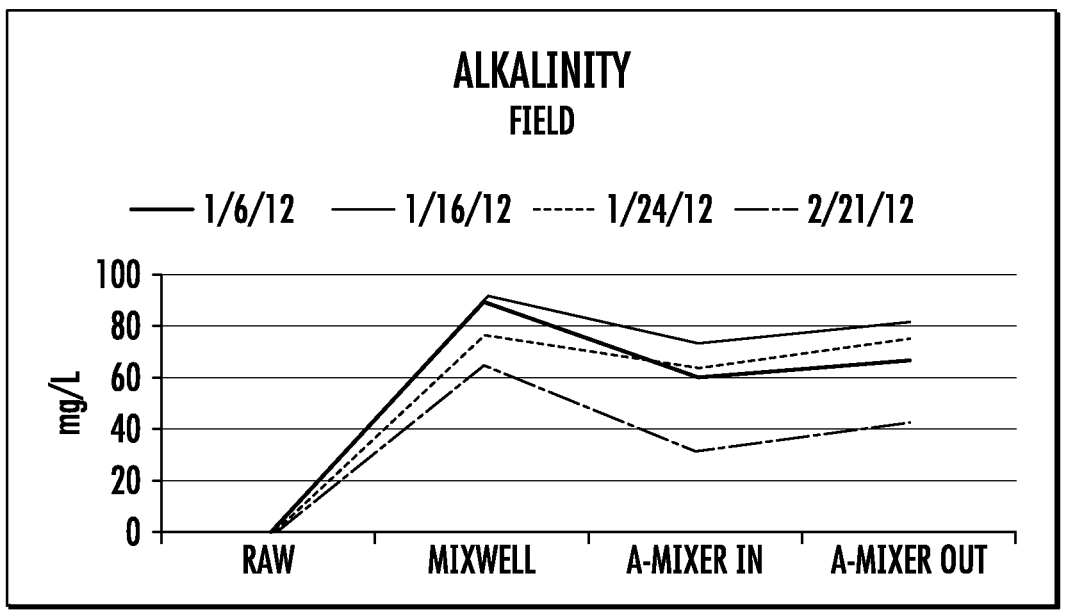
FIG. 10 is a graph comparing field alkalinity levels through stages during various trials at the Manor site.

FIG. 10 shows the alkalinity measured in the field for the treatment system. As expected alkalinity rises as the pebble quicklime is added in the MixWell. The alkalinity then decreases in the lime channel as oxygen reacts to convert ferrous iron into ferric hydroxide. Alkalinity is again given a slight boost in the A-Mixer despite the introduction of air in the system.

Dissolved Iron

Figure 11:
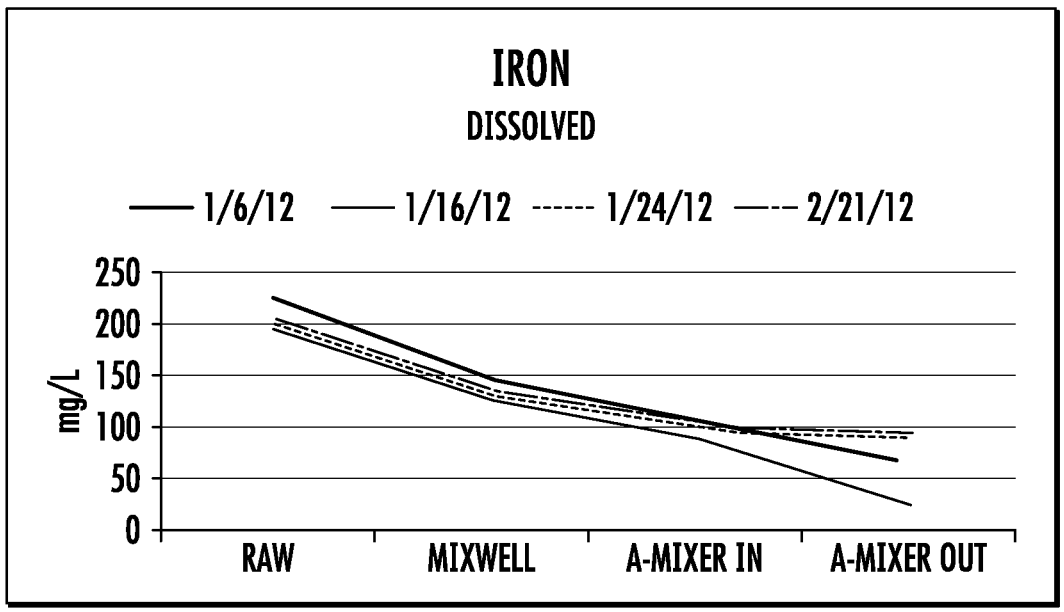
FIG. 11 is a graph comparing Dissolved Iron levels through stages during various trials at the Manor site.

Samples for dissolved iron were taken at each of the four sampling locations. These samples were allowed to sit for 10 minutes while the flock settled then the supernatant was field filtered using a 0.45 micron filter. FIG. 11 shows a significant decrease in dissolved iron as the water traverses the treatment system.

Dissolved iron concentrations within the A-Mixer dropped on two dates, Jan. 16, 2012 and Jan. 24, 2012, but were stable on the other two dates when there was no change in dissolved iron concentration. This variation is correlated with the pH of the A-Mixer inlet. The pH was between 6.8 and 7.0 on the days that showed a decrease in dissolved iron. The pH was below 6.8 on the days that dissolved iron remained unchanged.

Sulfate & Dissolved Calcium

Figure 12:
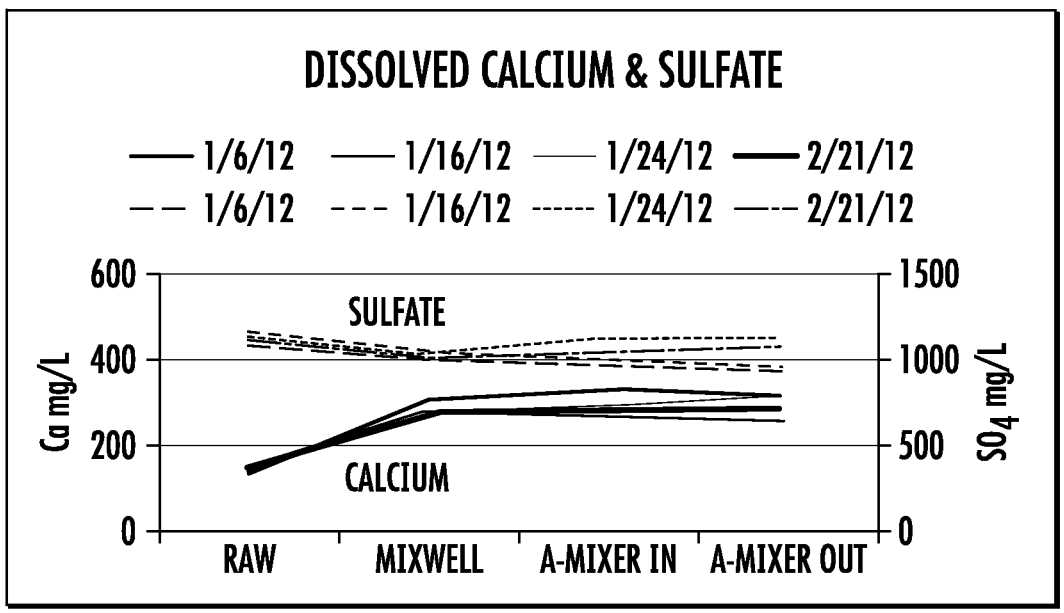
FIG. 12 is a graph comparing Dissolved Calcium and Sulfate levels through stages during various trials at the Manor site.

Sulfate concentrations in the raw water ranged from 1,095 to 1,192 mg/L and the dissolved calcium values ranged from 134 to 159 mg/L. FIG. 12 is a plot of the Sulfate and Dissolved Calcium data across the treatment system. Note that the dissolved calcium increase resulting from the MixWell corresponds to a Sulfate decrease at the same time. This suggests gypsum precipitation in the MixWell. There is little consistent change in these dissolved constituents throughout the rest of the treatment system.

It is clear from FIGS. 8, 10, and 12 that the MixWell is doing the bulk of the pebble quicklime dissolution, and that there is gypsum precipitation occurring in the MixWell. On January 6, the MixWell contributed 75 percent of the dissolved calcium added during the treatment process.

Efforts to use dissolved calcium to measure system performance of the A-Mixer were frustrated by spatial, temporal, and possibly gypsum and calcite variations across the site. As a consequence on one sampling trip the dissolved calcium increased in the A-Mixer and on three occasions the dissolved calcium level decreased. This decrease occurred even though alkalinity increased.

From the raw lime and other materials taken from the bottom of the MixWell (MixWell Sludge), the inventors noted the percentage of "dark matter" or grit concentration relative to white calcium oxide therein. While heavier grit particles can help with the mechanical degradation of the pebble quicklime, at some point the grit must be drained from the system when it becomes excessive. The inventors also noted the rounded surfaces to some of the pebble quicklime extracted. Such rounding can be from abrasion or chemical dissolution of the particle surface. Still other pebbles, including some gypsum pebbles, showed the effects of abrasion.

In two effluent samples, black particles were observed. They are believed to be the inert components of pebble quicklime product. Manufacturer-provided data indicated that the pebble quicklime product used had a calcium oxide content of 94.4 percent and a lime index of 92.3 percent. About six percent of that product was grit. As the lime dissolved, the percentage of grit in the remaining particles increased.

Figure 13:
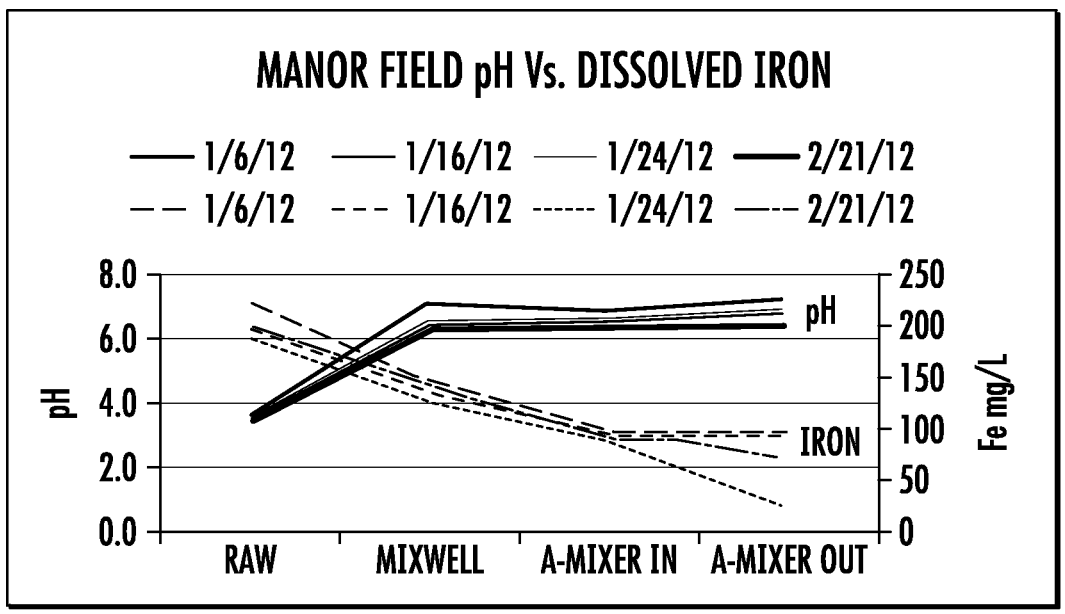
FIG. 13 is a graph comparing pH to Dissolved Iron levels through stages during various trials at the Manor site.

The MixWell and A-Mixer discharges were wet sieved. This limited the particle size that could be captured to screens that were not blinded by the ferrous flock (80 mesh screen). In addition, the 12-inch sieves were not large enough to capture the entire flow consequently; a mass flow rate was not possible. Because of that, the relative pile sizes observed should not be quantitatively compared. FIG. 7 showed a particle size reduction between the MixWell discharge and the A-Mixer discharge. It is suspected that more lime will be dissolved in the A-Mixer when the inlet pH is greater than 7 as the acidity from the dissolved ferrous iron is released. This suspicion is based on the drop in dissolved iron that occurs when the pH is greater than 7 combined with an increase in pH at the same time. FIG. 13 shows this relationship on the January 16 sampling date, the dissolved iron dropped from 88 to 22 mg/L while the pH rose from 7.1 to 7.38. Water with lower pH does not benefit from the dissolved iron reduction. At the higher pH oxygen reacts more quickly with the ferrous iron converting it to ferric iron. This process releases acidity that is neutralized by the remaining undissolved quicklime particles being held in suspension by the A-Mixer. The net result is that when the inlet pH is maintained at or above 7 iron oxidation in the A-Mixer occurs rapidly releasing acidity into the water this acidity is immediately neutralized by the suspended calcium oxide particles leading to a higher outflow pH and a higher alkalinity.

Figure 14:
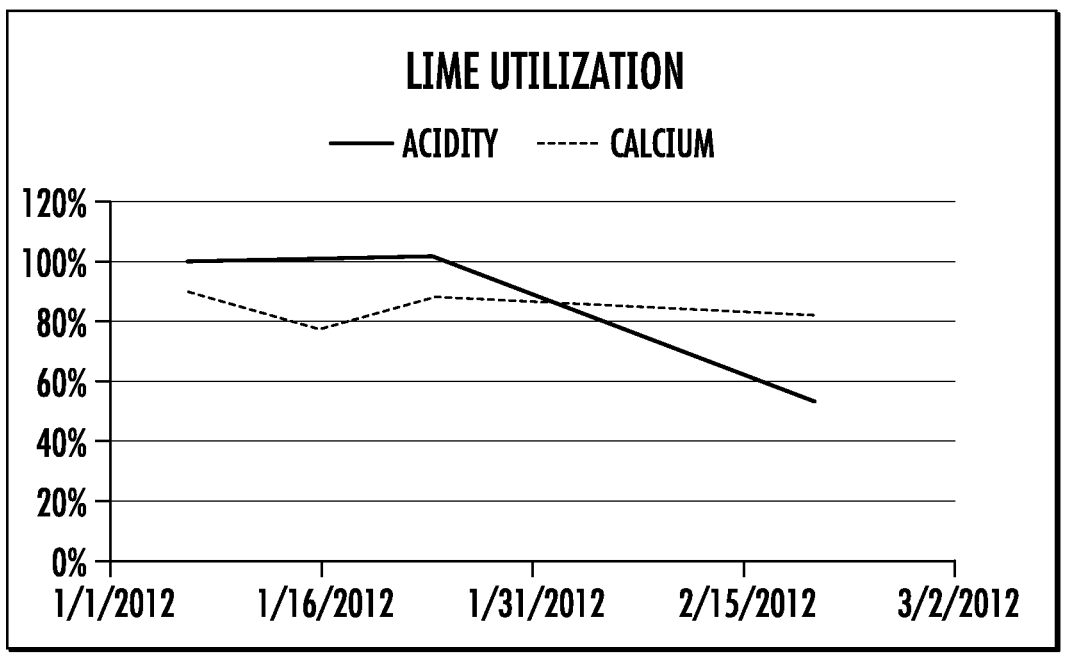
FIG. 14 is a graph comparing Lime Utilization percentages based on initial acidity and stoichiometric calcium levels.

The proof of the technology is based on the lime utilization rate. Three approaches were taken to establish this rate. First, the acidity of the mine water was used to calculate the amount of pebble quicklime required to neutralize that acidity. This calculated value was then compared with the actual amount of pebble quicklime added. On three occasions, pebble quicklime was captured from the lime auger over a one minute period and these samples were weighed and used to compute the lime efficiency. On Feb. 21, 2012, the lime feed was not captured. Instead, the lime delivered per revolution on the prior sampling was used to calculate the lime added for this date. Consequently, it is not known if the lime dosage on this date is an accurate reflection of the actual lime dosage. The lime dose on this date was further complicated by the system being down for several days prior to the sampling event. It is believed that the operator was overdosing in an effort to raise the pH in the settling ponds. The lime efficiency in excess of 100 percent may be due to higher quality pebble quicklime being delivered than was reported on the lime analysis, or it could represent some amount of under treatment in the system. These data are shown in FIG. 14 which also shows a plot of the lime utilization rate based on the stoichiometric amount of calcium needed to treat the mine water. This approach is confounded by gypsum and possibly calcite formation within the system. The formation of gypsum or calcium, if taken into account, would increase the reported lime utilization rate.

Figure 15:
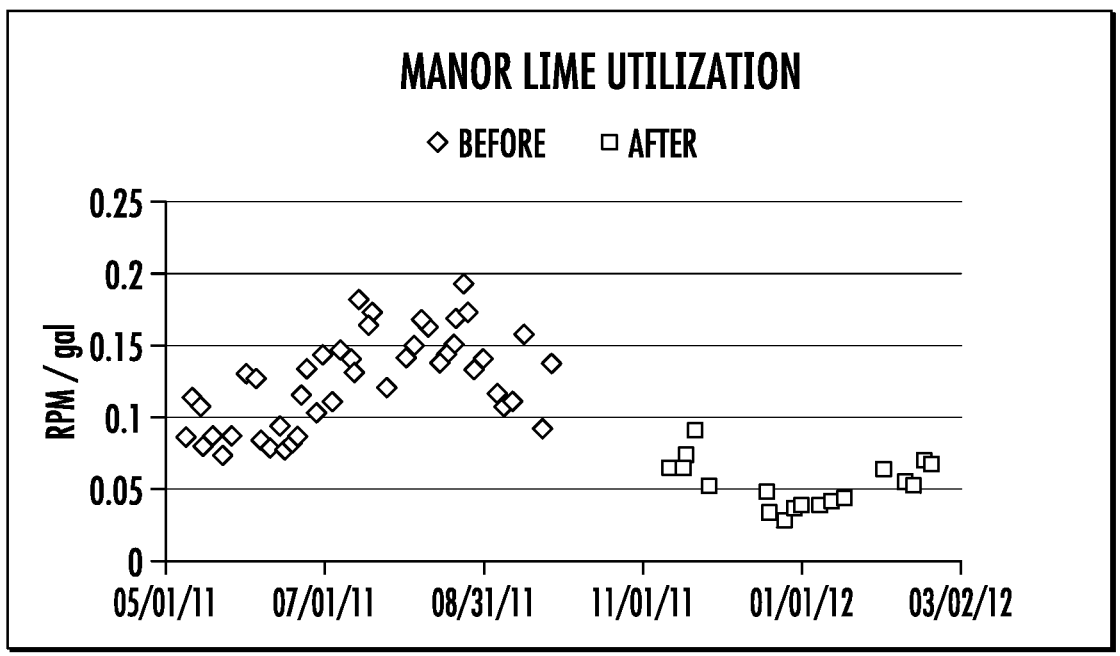
FIG. 15 is a graph comparing Lime Utilization levels before and after implementation of the invention at the Manor site.

The ultimate test of lime utilization is a comparison of the lime usage before and after the MixWell and A-Mixer retrofit. Plant personnel have adjusted the lime delivery of the plant so that their discharge criteria are maintained both before and after the plant retrofit. Using the plant log book the flow rate and the Aquafix revolutions per minute (RPM) were recorded. The RPM data were divided by the flow data to yield a metric of RPM/gal. This metric was then plotted against time and graphed in FIG. 15. The before and after data show a definitive improvement in the lime required. The average RPM/gal before the retrofit was 0.1255 after the retrofit the RPM/gal was 0.0719. This indicates that the new plant is operating on 43 percent of the lime that was required prior to the rebuild. Before the retrofit annual lime cost was $30,000. The indicated savings in lime cost is $17,100 per year. This does not include the cost of dredging and disposal of un- or under-utilized lime in the first settlement pond.

CONCLUSIONS

Passive mixing technology can have a very significant improvement in lime utilization where pebble lime is the source of the alkalinity.

The MixWell technology is very effective at dissolving pebble quicklime and reducing the particle size of its effluent.

The A-Mixer, if operated at pH 7 or above, can advance the oxidation of ferrous iron while maintaining pH across the system.

While certain illustrative embodiments have been shown in the drawings and described above in considerable detail it should be understood that there is no intention to limit the invention to the specific forms disclosed. On the contrary the intention is to cover all modifications, alternative constructions, equivalents and uses falling within the spirit and scope of the invention as expressed in the appended claims.

What is claimed is:

1. A method for improving lime utilization rates at a water treatment facility, said method comprising:
   (a) providing a holding well adjacent a reagent feed source, said holding well having a pipe extending vertically through a middle region of said holding well, said pipe having a plurality of apertures near a base of the pipe, said base situated near a bottom of said holding well;
   (b) adding flush water into the holding well at or near the bottom of the holding well;
   (c) continuously adding a reagent consisting of pebble quicklime or hydrated lime from a feed source and into the holding well;
   (d) providing a source of water consisting of raw water or mine drainage water down the pipe extending vertically through the middle region of the holding well and out its apertures for causing larger particles of the reagent nearby to collide with one another and be ground to finer particle sizes; and
   (e) allowing the finer particle sizes to rise inside the holding well before passing out of said holding well.

2. The method of claim 1 which further comprises: providing a gravity drain for the holding well.

3. A method for improving lime utilization rates at a mine drainage treatment facility without using thick beds of suspended materials and without any external electrical supply, said method comprising:
   (a) providing a holding well adjacent a reagent feed source, said holding well having a pipe that extends vertically through a middle region of said holding well, said pipe having a plurality of apertures near a base of the pipe;
   (b) adding flush water into the holding well and downwardly around the pipe that extends vertically through the middle region of said holding well;
   (c) continuously adding a reagent consisting of pebble quicklime or hydrated lime from a feed source and into the holding well;
   (d) providing mine drainage water down the pipe that extends vertically through the middle region of said holding well and out the plurality of apertures near the base of the pipe for causing larger reagent particles nearby to collide with one another and be ground to finer particle sizes;
   (e) allowing the finer particle sizes to rise inside the holding well before passing out said holding well and into a holding tank having a large diameter pipe that extends vertically through a middle of said holding tank from a region below a normal fill level for said holding tank to a lower region that suspends said pipe upwardly from a bottom of said holding tank on a plurality of legs, said large diameter pipe having an air diffuser that extends downwardly through a middle of said large diameter pipe, said air diffuser being connected to a source of compressed air delivered from an air line connected to a Trompe air chamber; and (f) passing compressed air into the air diffuser for inducing a flow of water through said large diameter pipe and causing a convection-like circulation in the holding tank to enhance dissolution of a plurality of suspended fine lime particles before exiting the holding tank.

4. The method of claim 3 wherein step (d) further includes allowing said mine drainage water to dissolve at least some of said finer particle sizes.

5. The method of claim 3 which further comprises:

(g) conveying discharge from the holding tank to a settling pond.

* * * * *